US012728588B2

(12) United States Patent
Ding et al.

(10) Patent No.: US 12,728,588 B2
(45) Date of Patent: Sep. 8, 2026

(54) 3D PRINTING-BASED DEVICE FOR SHIELD TUNNEL LINING FORMATION

(71) Applicant: Zhejiang University City College, Hangzhou (CN)

(72) Inventors: Zhi Ding, Hangzhou (CN); Ke Lou, Hangzhou (CN); Yingtao Hu, Hangzhou (CN); Shijie Zhang, Hangzhou (CN); Zhen Wang, Hangzhou (CN); Wenwei Zhou, Hangzhou (CN); Huiping Tang, Hangzhou (CN)

(73) Assignee: Zhejiang University City College, Hangzhou (CN)

( * ) Notice: Subject to any disclaimer, the term of this patent is extended or adjusted under 35 U.S.C. 154(b) by 51 days.

(21) Appl. No.: 19/021,427

(22) Filed: Jan. 15, 2025

(65) Prior Publication Data

US 2025/0303633 A1 Oct. 2, 2025

(30) Foreign Application Priority Data

Mar. 30, 2024 (CN) ........................ 202410380119.X

(51) Int. Cl.

| | |
|---|---|
| ***B29C 64/118*** | (2017.01) |
| ***B29C 64/259*** | (2017.01) |
| ***B29C 64/295*** | (2017.01) |
| ***B29C 64/30*** | (2017.01) |
| ***B29C 64/393*** | (2017.01) |
| ***B29C 71/02*** | (2006.01) |
| ***B33Y 10/00*** | (2015.01) |
| ***B33Y 40/00*** | (2020.01) |
| ***B33Y 40/20*** | (2020.01) |
| ***B33Y 50/02*** | (2015.01) |

(Continued)

(52) U.S. Cl.

CPC .......... *B29C 64/118* (2017.08); *B29C 64/259* (2017.08); *B29C 64/295* (2017.08); *B29C 64/30* (2017.08); *B29C 64/393* (2017.08); *B29C 71/02* (2013.01); *B33Y 10/00* (2014.12); *B33Y 40/00* (2014.12); *B33Y 40/20* (2020.01); *B33Y 50/02* (2014.12); *B33Y 80/00* (2014.12); *E21D 11/40* (2013.01); *B29L 2031/10* (2013.01)

(58) Field of Classification Search

CPC ... B29C 64/118; B29C 64/259; B29C 64/295; B29C 64/30; B29C 64/393; B29C 71/02; B33Y 30/00; E21D 11/40; B28B 1/001

See application file for complete search history.

(56) References Cited

U.S. PATENT DOCUMENTS 11,873,718 B1 * 1/2024 Ding .................... E21D 9/0873

FOREIGN PATENT DOCUMENTS

CN 204716249 U 10/2015
CN 108104842 A 6/2018

(Continued)

*Primary Examiner* — Galen H Hauth
*Assistant Examiner* — Mohamed K Ahmed Ali

(57) ABSTRACT

The present disclosure provides a 3D printing-based device for shield tunnel lining formation, which utilize a more rapid and efficient extrusion process. Solid printing materials are fed into a specially structured tunnel forming mechanism via a pneumatic conveying system. In conjunction with a lining cooling jacket and a shield machine's advancement control device, the 3D printing-based device enables continuous 3D printing of the tunnel lining.

10 Claims, 6 Drawing Sheets

(a)

(b)

(51) Int. Cl.

| | |
|---|---|
| ***B33Y 80/00*** | (2015.01) |
| ***E21D 11/40*** | (2006.01) |
| *B29L 31/10* | (2006.01) |

(56) References Cited

FOREIGN PATENT DOCUMENTS

| | | | | |
|---|---|---|---|---|
| CN | 208578569 U | | | 3/2019 |
| CN | 216831448 U | | * | 6/2022 |
| CN | 217435034 U | | | 9/2022 |
| CN | 115653627 B | | | 5/2023 |
| CN | 117307198 A | | | 12/2023 |

* cited by examiner (a)

(b)

(I)

(II)

3D PRINTING-BASED DEVICE FOR SHIELD TUNNEL LINING FORMATION

CROSS REFERENCE TO RELATED APPLICATIONS

The present application claims the benefit of Chinese Patent Application No. 202410380119.X filed on Mar. 30, 2024, the contents of which are incorporated herein by reference in their entirety.

TECHNICAL FIELD

The present disclosure belongs to the field of advanced manufacturing, particularly relating to a 3D printing-based device for shield tunnel lining formation.

BACKGROUND

With the development of China's economy, the intensity of infrastructure construction in major cities has been continuously increasing, leading to a significant rise in the number of tunnel engineering projects such as railways, highways, municipal works, and utility tunnels. For some special soil or rock layers, it is necessary to use the Shield tunnel boring machines (TBM) method for tunnel construction. As an important construction method suitable for modern tunnel and underground engineering, the Shield TBM tunneling method will play a crucial role. However, during traditional tunnel construction, the shield machine and tunnel lining segments are extremely heavy, often requiring transportation over hundreds of kilometers to the construction site, which results in high costs and transportation expenses. Additionally, when placing the segments, most TBMs are stationary, unable to operate continuously, significantly reducing the efficiency of shield construction. Therefore, how to improve construction efficiency, reduce costs, and lower expenses during the tunnel excavation process is a pressing issue that needs to be addressed in this field.

In recent years, 3D printing technology, due to its advantages such as high forming accuracy, highly controllable forming processes, and the ability to easily create complex models that are difficult to achieve with traditional methods, has been widely applied in the field of civil engineering. For example, by using 3D printing materials like polymers and combining them with 3D printing technology, it is possible to print and manufacture tunnel lining structures on-site directly onto the tunnel pipes. By integrating with traditional earth pressure balance TBMs, there is hope to establish a shield construction technology based on 3D printing, thereby greatly reducing costs and transportation expenses. However, current technologies cannot achieve continuous advancement control; the tunnel boring machine cannot move forward continuously, resulting in poor continuity of tunnel excavation, and still fail to solve the problem of low shield construction efficiency.

The structure of existing shield machines includes: CN204716249U discloses a shield machine integrated with 3D printing technology, including a cylindrical shell, with a cutting device at the front end along the axis of the shell, a power unit inside the shell for pushing the shield machine forward, an operation platform at the rear end along the axis of the shell for controlling the power unit, and a 3D printing system at the back end of the shell along the axis. The 3D printing system includes a mounting shaft with rotational capability, with a plurality of 3D printers evenly distributed and fixed on the outer circumference of the mounting shaft. The 3D printers rotate around the mounting shaft and move along its outer circumference to produce an integrated tunnel structure on the inner wall of the tunnel. CN108104842A discloses a soft soil tunnel lining construction method and apparatus based on 3D printing technology, including a cutting wheel, control room, reaction force thrust mechanism, muck discharge channel, concrete pump, concrete pumping pipeline, admixture addition unit, robotic arm, print head, crawler vehicle, tunnel cross-section scanner, crawler vehicle positioner, robotic arm positioner, and print controller. The tunnel excavation module performs tunnel excavation for a set distance under the control of the excavation signal, and the concrete 3D printing module prints a ring-shaped concrete lining at the completed tunnel excavation site under the control of the printing signal. The steps of tunnel excavation and alternate printing on lining.

The shortcomings of the above-mentioned technologies include:

1) The integrated 3D printing of segments by the 3D printing technology shield machine involves the participation of rib plates during the manufacturing process, making it impossible to print the segments seamlessly.
2) The 3D printing technology shield machine does not have a cooling device, which prevents rapid solidification of the printed material, thus increasing construction time.
3) 3D printing technology shield machines are limited by the speed of the fast-forming 3D printing-based tunnel boring machine, and cannot perform efficient printing according to actual conditions.

SUMMARY

The purpose of the present disclosure is to overcome the deficiencies in the prior art, and a 3D printing-based device for shield tunnel lining formation is provided.

A 3D printing-based device for shield tunnel lining formation comprises an extrusion assembly, a heating and transportation assembly, a material delivery and distribution control assembly, a cooling assembly, a speed control assembly, a control system, and a lining forming assembly;

- the extrusion assembly includes a screw pump motor and a single-screw extruder;
- the heating and transportation assembly comprises a heating belt and a molten printing material transport pipe, and the molten printing material transport pipe is equipped with a heating device to maintain a temperature of the material during transportation in the molten printing material transport pipe;
- the material delivery and distribution control assembly includes a solid printing material delivery pipe, a detachable feed bucket, and a distribution controller;
- the cooling assembly includes a first lining cooling jacket and a second lining cooling jacket;
- the speed control assembly includes an external speed measuring instrument and a speed adjustment instrument;
- the control system includes a control panel;
- the lining forming assembly includes a lining forming mold; the lining forming mold comprises a lower part and an upper part, the lower part and the upper part are connected through and fixed; the lower part includes a plurality of lower components;
- each of the lower component includes a long side end connected to the upper part of the lining forming mold and includes a short side end connected to the molten printing material transport pipe; for each of the lower component, a circumference of the long side end is longer than that of the short side end, and the cross-sectional area of the long side end is less than or equal to that of the short side end;

a plurality of the long side ends are connected in series to form a circular ring that is connected and communicates with the upper part of the lining forming mold; a shape of the upper part of the lining forming mold is formed by nesting two cylindrical pipes with different diameters, and a space between nested layers constitutes an internal space of the upper part of the lining forming mold;

the lining forming mold is connected and communicated with the molten printing material transport pipe through the short side end of the lower component, and every the short side end connects to the molten printing material transport pipe;

a flow sequence of a molten printing material is as follows: entering the short side end from the molten printing material transport pipe, then flowing through the long side end into the upper part of the lining forming mold, and finally being extruded from the upper part of the lining forming mold.

As a preference: the shape of the lower component is such that when projecting the lower component and projections of both the long side end and the short side end are straight lines, the projection shape of the lower component is trapezoidal.

As a preference: the inner side of the upper part of the lining forming mold is equipped with an annular insulator to prevent the molten printing material from solidifying inside the upper part of the lining forming mold;

a thickness of a printing material extruded from the upper part of the lining forming mold is 10 mm-15 mm.

As a preference: wherein there are no fewer than three the molten printing material transport pipes;

the distribution controller is placed between the molten printing material transport pipe and the heating belt, so the printing material flows through the distribution controller before entering the molten printing material transport pipe; the distribution controller is used to adjust an inlet size of the molten printing material transport pipe to regulate a flow rate of the printing material;

each of the molten printing material transport pipe has its own distribution controller, allowing for independent control of the flow rate of the printing material in each molten printing material transport pipe.

As a preference: after the printing material is extruded from the lining forming mold, the printing material becomes a tubular printing material, and an outer surface of the tubular printing material is in contact with an inner wall of the shield tunnel, and an inner wall of the tubular printing material encircling the 3D printing-based device;

as the 3D printing-based device advances, the tubular printing material first comes into contact with an outer wall of the first lining cooling jacket and then comes into contact with an outer wall of the second lining cooling jacket, while at the same time, cooling water circularly passes through the first lining cooling jacket and the second lining cooling jacket to regulate a temperature of the first lining cooling jacket and the second lining cooling jacket in order to assist in cooling the tubular printing material to the target strength through heat conduction.

As a preference: in an advancing direction of the 3D printing-based device, an outer periphery diameter of the second lining cooling jacket is smaller than an outer periphery diameter of the 3D printing-based device located in front of the second lining cooling jacket, and the outer periphery diameter of the second lining cooling jacket is larger than an outer periphery diameter of the 3D printing-based device located behind the second lining cooling jacket;

a release agent is on the outer wall of the 3D printing-based device located behind the second lining cooling jacket to prevent adhesion between the tubular printing material and the outer wall of the 3D printing-based device.

As a preference: the screw pump motor adjusts the squeezing pressure exerted on the printing material by modulating a rotational torque, ensuring that the molten printing material fills the molten printing material transport pipe and the lining forming mold without any air pocket, thereby guaranteeing that the printing material is continuous and integral when extruded from the upper part of the lining forming mold.

A method for using the 3D printing-based device of claim 1, comprising the following steps:

step 1: after the start of a tunnel excavation, as the 3D printing-based device advances in a tunnel, a solid printing material is delivered to the detachable feed bucket via the solid printing material delivery pipe, and the detachable feed bucket is directly connected to an inlet of the single-screw extruder, allowing the solid printing material to flow into the inlet of the single-screw extruder under the influence of gravity;

step 2: while maintaining a transportation of the solid printing material, the solid printing material is conveyed to a front end of the single-screw extruder by continuously rotating a screw of the single-screw extruder, and the front end of the single-screw extruder is distinguished by the advancing direction of the 3D printing-based device;

step 3: the solid printing material melts to become the molten printing material under a heating effect of the heating belt when reaching the heating belt; the molten printing material is then distributed to the molten printing material transport pipe through the distribution controller and subsequently enters the lining forming mold;

step 4: after the molten printing material fills the lower part of the lining forming mold, it converges at the long side end and enters the upper part of the lining forming mold, thus forming a full annular surface;

the molten printing material becomes the tubular printing material as a complete segment that fits against the inner wall of a tunnel around the 3D printing-based device when moving forward under pressure passing through the first lining cooling jacket and the second lining cooling jacket for cooling.

As a preference: an operation of the speed control assembly comprising the following steps:

step 1: set an initial advancing speed V0 of the 3D printing-based device and an initial rotational speed V1 of the screw pump motor at a control center;

step 2: when environmental factors cause an advancing speed of the 3D printing-based device to deviate from the initial advancing speed V0, adjustments are made via the control center to bring the advancing speed of the 3D printing-based device back to the initial advancing speed V0; the environmental factors include encountering one or more of following soil conditions:

frozen ground, rock, clay, sand, gravel, poor geological areas, and karst formations;

step 3: when construction difficulty of a current environment is lower than that of an environment at the initial advancing speed V0, increasing the advancing speed of the 3D printing-based device to a speed V2, and V2>V0, and a rotational speed of the screw pump motor is automatically adjusted to a speed V3 by the control system, and V3>V1, which makes a cooling rate of the printing material during solidification match with the speed V2 by accelerating the rotational speed to ensure that the tubular printing material formed at the speed V2 of the 3D printing-based device connects seamlessly with the tubular printing material formed at the initial advancing speed V0 of the 3D printing-based device without any bulging; accelerating the rotational advancing speed increases a rate of material transportation;

evaluation indicators of the construction difficulty include one or more of the following factors: the number of types of soil layers in the environment, whether there are buildings around the tunnel, whether the tunnel is within an urban area, and a requirement for noise and environmental pollution at a construction site;

step 4: when the construction difficulty of the current environment is greater than that of the environment at the initial speed V0, reducing the advancing speed of the 3D printing-based device to a speed V4, and V4<V0, and a rotational advancing speed of the screw pump motor is automatically adjusted to V5 by the control system, and V5<V1, which makes a cooling rate of the printing material during solidification match with the speed V4 by reducing the rotational speed to ensure that the tubular printing material formed at the speed V4 of the 3D printing-based device connects seamlessly with the tubular printing material formed at the initial advancing speed V0 of the 3D printing-based device without any bulging; reducing the rotational advancing speed lows down the rate of the material transportation.

As a preference: a shield machine advancement control device is set behind the 3D printing-based device which is used to achieve a simultaneous output of the tubular printing material while the 3D printing-based device advances, realizing a continuous printing of a lining structure.

The structure of the shield machine advancement control device is as described in CN 115653627B, which is incorporated herein by reference in its entirety.

The present disclosure has the beneficial effects as follows:

1) The present disclosure introduces a new extrusion molding process. With the structure of the lining forming mold, the tubular printing material extruded is seamless, ensuring the stable and integrated formation of the 3D printed tunnel lining. No further lining installation steps are required, achieving continuous tunnel lining printing, greatly improving construction efficiency, significantly shortening the construction period, and effectively reducing construction costs. The printing material in this application contacts the inner wall of the tunnel without voids after leaving the lining forming mold.

2) The present disclosure, by setting up the first and second lining cooling jackets on the exterior of the 3D printing-based device that can come into contact with the printing material, helps the printing material cool down to the target strength and assists in mold releasing, making the printing material bond more firmly with the inner wall of the tunnel.

3) The present disclosure, by setting up the molten printing material transport pipes and distribution controllers, can adjust the output speed of the printing material according to the advancement speed of the 3D printing-based device, and can prevent the extruded molten printing material from clogging or blocking. It ensures the quality of the lining while adjusting the operating speed of the 3D printing-based device according to the construction situation, expanding the applicable scenarios of the 3D printing-based device.

4) The present disclosure sets up a shield machine advancement control device for 3D printing-based device for shield tunnel lining formation which can ensure that the shield machine alternates operations and continuously advances forward during tunnel excavation, realizing the continuous printing of the lining structure, greatly improving the efficiency of shield construction, significantly shortening the construction period, and reducing construction costs.

The 3D printing-based device for shield tunnel lining formation provided by the present disclosure greatly enhances the efficiency and quality of tunnel construction, providing strong support for the smooth progress of engineering projects, and are expected to further promote the development and advancement of the industry.

In the figures: 1, screw pump motor; 2, single-screw extruder; 3, heating belt; 4, molten printing material conveyance tubing; 5, solid printing material delivery pipe; 6, removable feed hopper; 7, flow diverter controller; 8, lining cooling jacket one; 9, lining cooling jacket two; 10, external equipment speed gauge; 11, speed adjustment instrument; 12, control system; 13, lining forming mold; 14, lower part of the lining forming mold; 15, upper part of the lining forming mold; 16, lower assembly; 17, long side end; 18, short side end; 19, insulation device.

DETAILED DESCRIPTION

To make the objectives, technical solutions, and advantages of the present disclosure clearer, a detailed description of the technical solution of the present disclosure will be provided below. It is evident that the embodiment described are merely a part of the embodiment of the present disclosure, rather than all of them. Based on the embodiment in the present disclosure, all other embodiment obtained by those skilled in the art without making creative efforts fall within the scope of protection of the present disclosure.

Embodiment One

Figure 2:
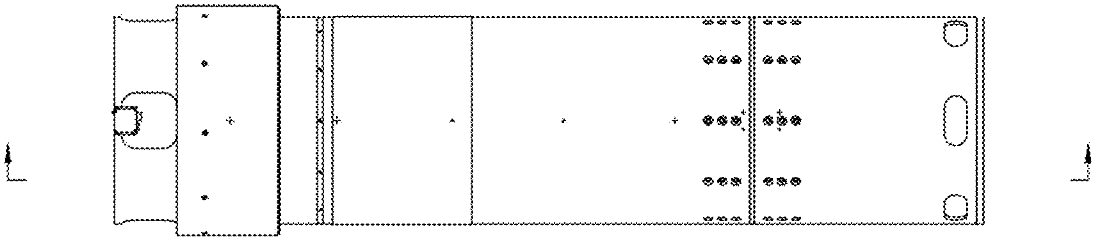
FIG. 2 shows an illustration (a) and a general sectional schematic (b) of the 3D printing-based tunnel boring machine for rapid construction of shield tunnel lining.
Figure 2:
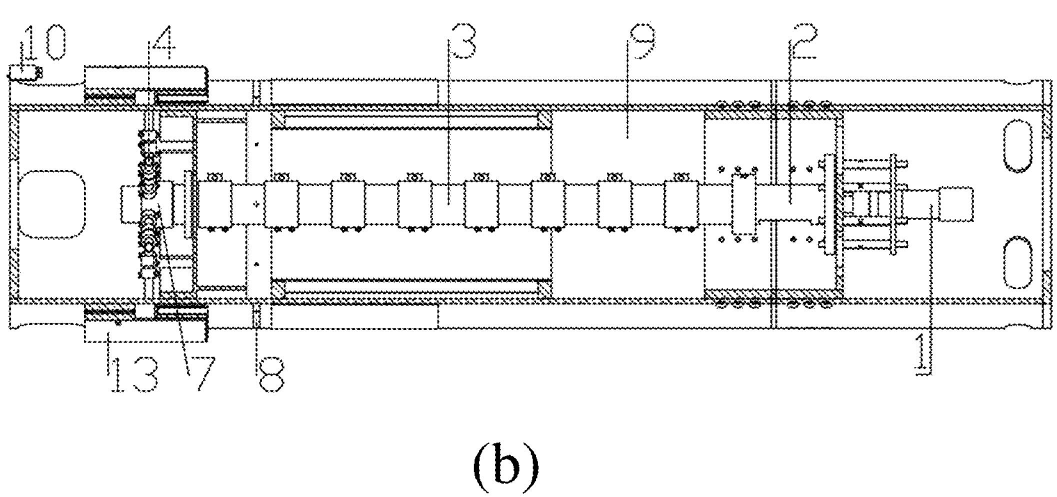
Figure 3:
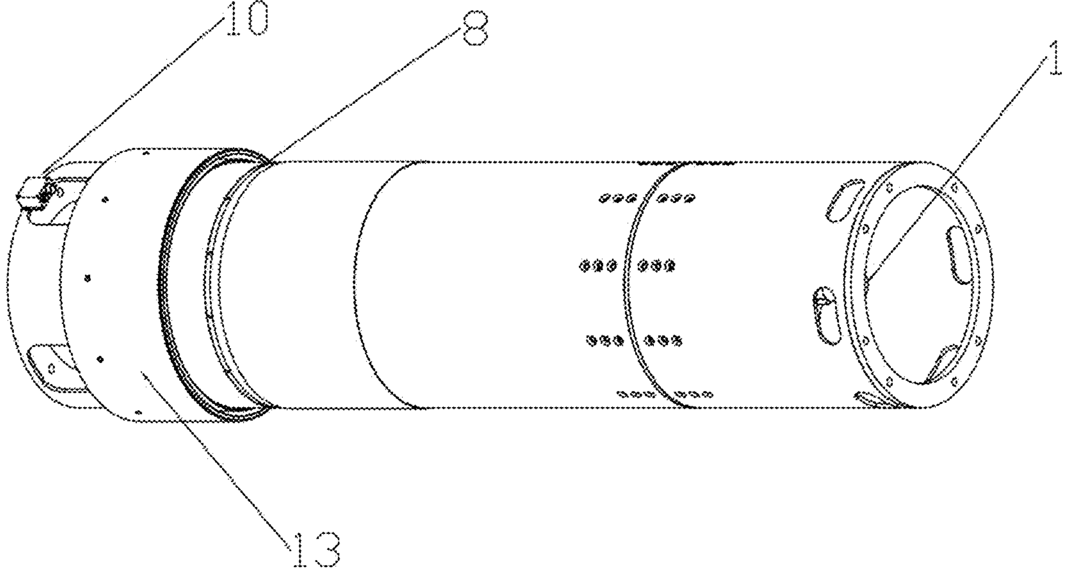
FIG. 3 is a perspective view of the 3D printing-based tunnel boring machine for rapid construction of shield tunnel lining.

The 3D printing-based device for shield tunnel lining formation provided by the present disclosure, as shown in FIG. 2 and FIG. 3, includes: an extrusion assembly, a heating and transportation assembly, a material delivery and distribution control assembly, a cooling assembly, a speed control assembly, a control system, and a lining forming assembly;

The extrusion assembly comprises a screw pump motor 1 and a single-screw extruder 2.

The heating and transportation assembly includes a heating belt 3 and a molten printing material transport pipe 4, with the molten printing material transport pipe equipped with a heating device to maintain the temperature during transportation.

Figure 7:
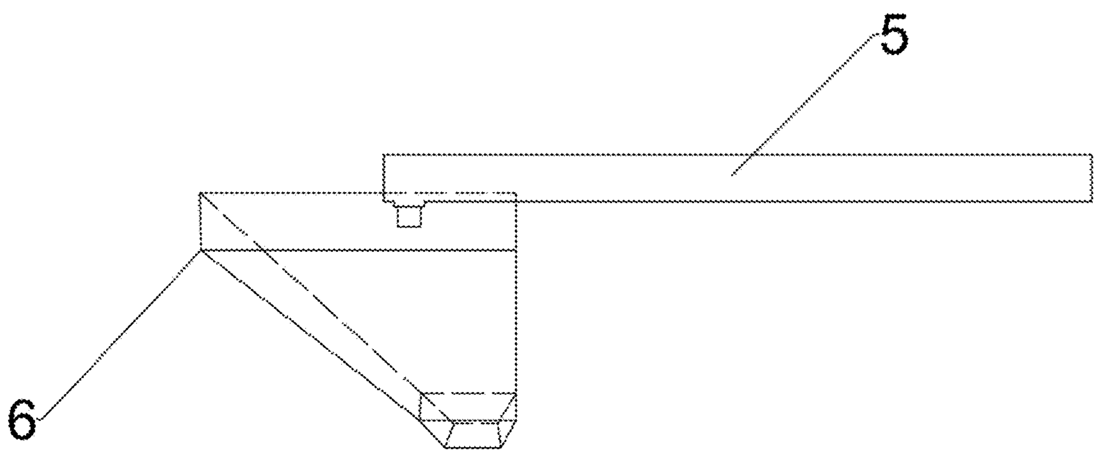
FIG. 7 is a schematic diagram of the material delivery component for the 3D printing-based tunnel boring machine for rapid construction of shield tunnel lining.

The material delivery, as shown in FIG. 7, includes a solid printing material delivery pipe 5, a detachable feed hopper 6, and a flow diverter controller 7.

The cooling assembly includes a first lining cooling jacket 8 and a second lining cooling jacket 9.

Figure 5:
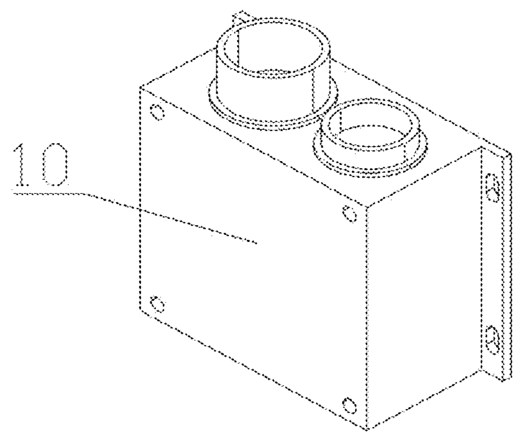
FIG. 5 illustrates the speed measurement instrument of the external device used in the 3D printing-based tunnel boring machine for rapid construction of shield tunnel lining.

The speed control, as shown in FIG. 5, includes an external device speed measurement instrument 10 and a speed adjustment instrument 11.

Figure 8:
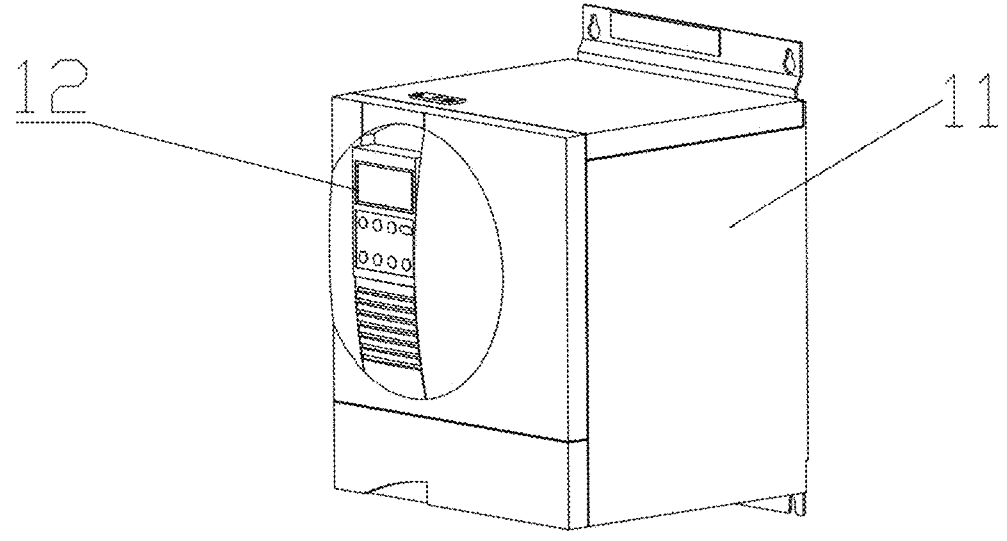
FIG. 8 shows the speed adjustment instrument and control system of the 3D printing-based tunnel boring machine for rapid construction of shield tunnel lining.

The control system, as shown in FIG. 8, a control panel 12.

Figure 6:
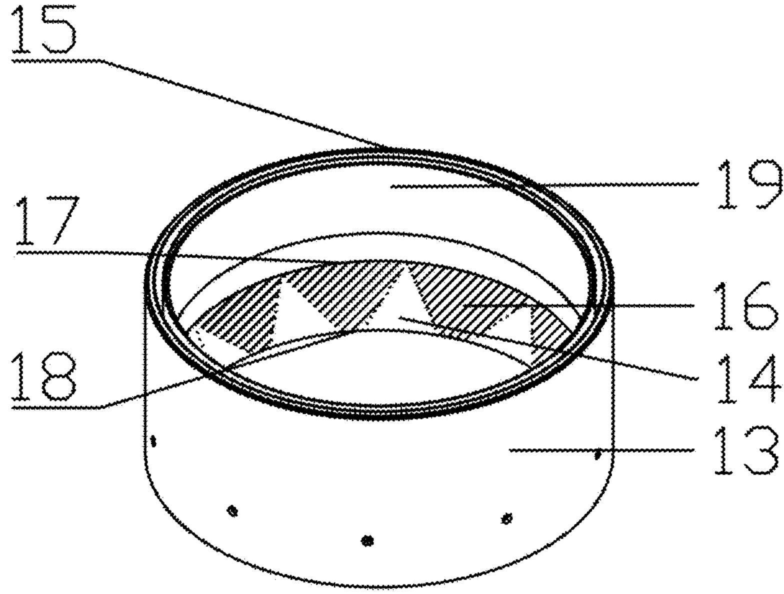
FIG. 6 is a schematic diagram of the lining forming mold for the 3D printing-based tunnel boring machine for rapid construction of shield tunnel lining.

The lining forming assembly includes a lining forming mold 13, as shown in FIG. 6. The lining forming mold 13 consists of a lower part 14 and an upper part 15, which are connected through and fixed together. The lower part 14 of the lining forming mold includes a plurality of lower assemblies 16, each having a long side end 17 connected to the upper part 15 of the lining forming mold and a short side end 18 connected to the molten printing material transport pipe 4. The circumference of the long side end 17 is longer than that of the short side end 18, and the cross-sectional area of the long side end 17 is less than or equal to that of the short side end 18.

A plurality of long side ends 17 are connected in series to form a circular ring that connects and communicates with the upper part 15 of the lining forming mold. The shape of the upper part 15 of the lining forming mold is formed by nesting two cylindrical pipes of different diameters, and the space between the nested layers constitutes the internal space of the upper part 15 of the lining forming mold. In this embodiment, the diameters of the two pipes forming the upper part 15 of the lining forming mold are 1000 mm and 1015 mm, respectively.

The lining forming mold 13 is connected and communicated with the molten printing material transport pipe 4 via the short side end 18 of the lower assembly 16. Each short side end 18 connects to one molten printing material transport pipe 4. In this embodiment, there are six lower assemblies 16.

The flow sequence of the extruded molten printing material is as follows: entering from the molten printing material transport pipe 4 into the short side end 18, then flowing through the long side end 17 into the upper part 15 of the lining forming mold, and finally being extruded from the upper part 15 of the lining forming mold.

The shape of the lower assembly 16 is such that when projecting the lower assembly 16, if the projections of both the long side end 17 and the short side end 18 are straight lines, the projection shape of the lower assembly 16 is trapezoidal.

The inner side of the upper part 15 of the lining forming mold is provided with an annular insulator 19 to prevent the extruded molten printing material from solidifying inside the upper part 15 of the lining forming mold.

The thickness of the printing material extruded from the upper part 15 of the lining forming mold is 10 mm-15 mm.

Figure 4:
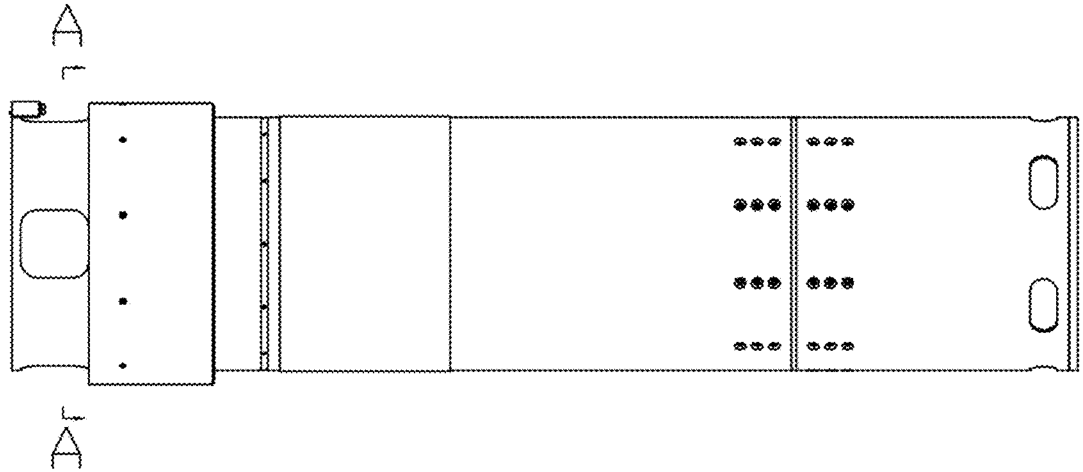
FIG. 4 provides a front view (I) and a cross-sectional view at A-A (II) of the 3D printing-based tunnel boring machine for rapid construction of shield tunnel lining.
Figure 4:
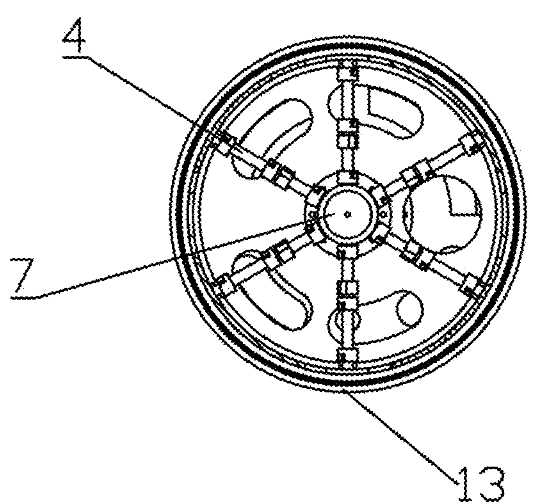

As shown in FIG. 4, there are no fewer than three molten printing material transport pipes 4. In this embodiment, as shown in FIG. 4, there are six molten printing material transport pipes 4. A flow diverter controller 7 is placed between the molten printing material transport pipe 4 and the heating belt, so the printing material flows through the flow diverter controller 7 before entering the molten printing material transport pipe 4. The flow diverter controller 7 is used to adjust the inlet size of the molten printing material transport pipe 4 to regulate the flow rate of the printing material. Each molten printing material transport pipe 4 has its own flow diverter controller 7, allowing for independent control of the flow rate of the printing material in each molten printing material transport pipe 4. In this embodiment, the flow rate of the printing material allowed by the flow diverter controller 7 is 0-1000 mm/min.

After the printing material is extruded from the mold, the printing material forms a tubular shape, with the outer surface of the tubular printing material in contact with the inner wall of the shield tunnel, and the inner wall of the tubular printing material encircling the 3D printing-based device. Since the printing material is in a molten state at this point, it needs to cool and solidify to achieve the desired strength to withstand soil pressure. To accelerate cooling, the molten printing material must be forcibly cooled. As the shield machine advances, the printing material first comes into contact with the outer wall of the first lining cooling jacket 8, then with the outer wall of the second lining cooling jacket 9. At the same time, a cooling water circulation passes through the first 8 and second 9 lining cooling jackets, regulating the temperature of the cooling water to maintain a rated temperature on the outer walls of the first 8 and second 9 lining cooling jackets, assisting in the cooling of the printing material to the target strength through heat conduction. In this embodiment, the temperatures of the outer walls of the first 8 and second 9 lining cooling jackets are 10° C. and 5° C., respectively.

With the direction of advance of the shield machine as the front and the direction of retreat as the rear, the diameter of the outer periphery of the second lining cooling jacket 9 is smaller than the outer periphery diameter of the 3D printing-based device located at the front of the second lining cooling jacket 9, and the diameter of the outer periphery of the second lining cooling jacket 9 is larger than the outer periphery diameter of the 3D printing-based device located at the rear of the second lining cooling jacket 9. In this embodiment, the diameter of the outer periphery of the second lining cooling jacket 9 is 995 mm, with a diameter of 995 mm at its front and 990 mm at its rear.

A release agent is applied to the outer wall of the 3D printing-based device at the rear of the second lining cooling jacket 9 to prevent adhesion between the printing material and the casing of the 3D printing-based device due to shrinkage of the printing material upon cooling.

The screw pump motor 1 adjusts the squeezing pressure exerted on the printing material by modulating the rotational torque, ensuring that the printing material fills the molten printing material transport pipe 4 and the lining forming mold 13 without air pockets, thereby guaranteeing continuous and integral modeling of the printing material extruded from the upper part 15 of the lining forming mold. In this embodiment, the squeezing pressure applied to the printing material is 50N-500N.

Embodiment Two

This application also provides a printing method based on the 3D printing-based tunnel boring machine for rapid construction of shield tunnel lining as described in Embodiment 1, including the following steps:

Step 1: After the start of tunnel excavation, as the shield machine advances, solid printing material is delivered to the detachable feed hopper 6 via the solid printing material delivery pipe 5. The detachable feed hopper 6 is directly connected to the inlet of the single-screw extruder 2, and the printing material flows into the inlet of the single-screw extruder 2 under the influence of gravity.

Step 2: While maintaining the transportation of solid granular materials, the solid granular materials are conveyed to the front end of the extrusion machine by continuously rotating the screw of the single-screw extruder 2, with the end closer to the direction of advancement of the 3D printing-based device being the front end of the extrusion machine.

Step 3: Upon reaching the heating belt 3, the granular material continuously melts under the heating effect of the heating belt 3. The extruded molten printing material is then distributed to the molten printing material transport pipe 4 through the flow diverter controller 7 and subsequently enters the lining forming mold 13.

Step 4: After the extruded molten printing material fills the lower part 14 of the lining forming mold 13, it converges at the long side end 17 and enters the upper part 15 of the lining forming mold, thus forming a complete annular surface. Under pressure, the extruded molten printing material moves forward, passing through the first 8 and second 9 lining cooling jackets for cooling, and forms a complete segment that fits against the inner wall of the tunnel around the 3D printing-based device.

Figure 1:
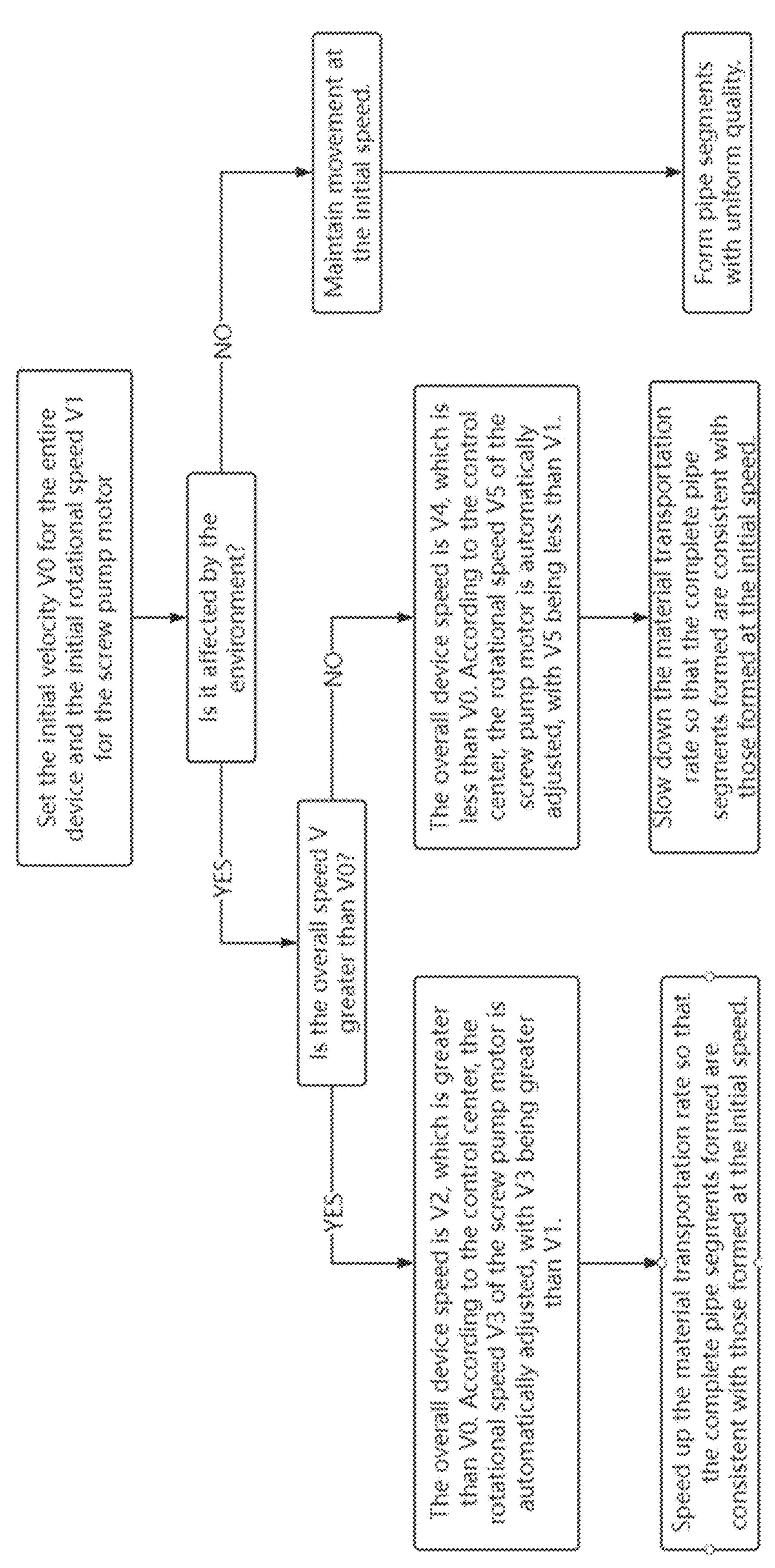
FIG. 1 is a step diagram showing the operation of the speed control component of the 3D printing-based tunnel boring machine for rapid construction of shield tunnel lining.

In this embodiment, the operation of the speed control assembly includes the following steps, as shown in FIG. 1:

Step 1: Set the initial speed V0 of the 3D printing-based device and the initial rotational speed V1 of the screw pump motor 1 at the control center 12.

Step 2: When environmental factors cause the speed of the 3D printing-based device to deviate from the initial speed V0 during operation, adjustments are made via the control center 12 to bring the speed back to V0. These environmental factors include, but are not limited to, encountering one or more of the following soil conditions: frozen ground, rock, clay, sand, gravel, poor geological areas, karst formations.

Step 3: When the construction difficulty of the current environment is lower than that of the environment at the initial speed V0, the evaluation indicators of construction difficulty include one or more of the following: the number of types of soil layers in the environment, whether there are buildings around the tunnel, whether the tunnel is within an urban area, and the requirements for noise and environmental pollution at the construction site. Where the fewer the types of soil layers, the lower the difficulty; if there are no other buildings around the tunnel, the construction difficulty is lower; if the tunnel construction is not within an urban area, the difficulty is lower; if there are no noise and dust content requirements around the tunnel, the construction difficulty is lower. The excavation speed of the 3D printing-based device is increased to V2, and V2>V0, and the rotational advancing speed of the screw pump motor 1 is automatically adjusted to V3 by the control system 12, and V3>V1. By accelerating the rotational advancing speed of the screw pump motor, the rate of material transportation is increased, making the cooling and solidification speed of the printing material through the cooling assembly coordinate with the advancement speed of the 3D printing-based device, ensuring that the formed tubular printing material connects seamlessly with the tubular printing material formed at the initial speed without any bulging.

Step 4: When the construction difficulty of the current environment is higher than that of the environment at the initial speed V0, the excavation speed of the 3D printing-based device should be reduced to V4, and V4<V0, and the rotational advancing speed of the screw pump motor 1 is automatically adjusted to V5 by the control system 12, and V5<V1. By reducing the rotational advancing speed of the screw pump motor, the rate of material transportation is slowed down, making the cooling and solidification speed of the printing material through the cooling assembly coordinate with the advancement speed of the 3D printing-based device, ensuring that the formed tubular printing material connects seamlessly with the tubular printing material formed at the initial speed without any bulging.

During the entire construction period in this embodiment, the range of V0 is 6-10m/day, and the range of V1 is 20-80 r/min.

A shield machine advancement control device is set behind the 3D printing-based tunnel boring machine, which is used to achieve the simultaneous output of printing material while the 3D printing-based device advances, realizing the continuous printing of the lining structure. The structure of the shield machine advancement control device is as described in CN 115653627B, which is incorporated herein by reference in its entirety.

The above specific implementation modes are used to explain and illustrate the present disclosure, rather than to limit it. Any modifications and changes made to the present disclosure within the spirit and scope of the claims fall within the protection scope of the present disclosure.

The invention claimed is:

1. A 3D printing-based device for shield tunnel lining formation, comprising an extrusion assembly, a heating and transportation assembly, a material delivery and distribution control assembly, a cooling assembly, a speed control assembly, a control system, and a lining forming assembly, wherein:

the extrusion assembly includes a screw pump motor and a single-screw extruder;

the heating and transportation assembly includes a heating belt and a molten printing material transport pipe, and the molten printing material transport pipe is equipped with a heating device to maintain a temperature of the material during transportation in the molten printing material transport pipe;

the material delivery and distribution control assembly includes a solid printing material delivery pipe, a detachable feed bucket, and a distribution controller;

the cooling assembly includes a first lining cooling jacket and a second lining cooling jacket;

the speed control assembly includes an external speed measuring instrument and a speed adjustment instrument;

the control system includes a control panel;

the lining forming assembly includes a lining forming mold; the lining forming mold comprises a lower part and an upper part, the lower part and the upper part are connected through and fixed; the lower part includes a plurality of lower components;

each of the lower component includes a long side end connected to the upper part of the lining forming mold and includes a short side end connected to the molten printing material transport pipe;

for each of the lower component, a circumference of the long side end is longer than that of the short side end, and the cross-sectional area of the long side end is less than or equal to that of the short side end;

a plurality of the long side ends are connected in series to form a circular ring that is connected and communicates with the upper part of the lining forming mold; a shape of the upper part of the lining forming mold is formed by nesting two cylindrical pipes with different diameters, and a space between nested layers constitutes an internal space of the upper part of the lining forming mold;

the lining forming mold is connected and communicated with the molten printing material transport pipe through the short side end of the lower component, and every the short side end connects to the molten printing material transport pipe;

a flow sequence of a molten printing material is as follows: entering the short side end from the molten printing material transport pipe, then flowing through the long side end into the upper part of the lining forming mold, and finally being extruded from the upper part of the lining forming mold.

2. The 3D printing-based device of claim 1, wherein the shape of the lower component is such that when projecting the lower component and projections of both the long side end and the short side end are straight lines, the projection shape of the lower component is trapezoidal.

3. The 3D printing-based device of claim 1, wherein the inner side of the upper part of the lining forming mold is equipped with an annular insulator to prevent the molten printing material from solidifying inside the upper part of the lining forming mold;

a thickness of a printing material extruded from the upper part of the lining forming mold is 10 mm-15 mm.

4. The 3D printing-based device of claim 1, wherein there are no fewer than three the molten printing material transport pipes;

the distribution controller is placed between the molten printing material transport pipe and the heating belt, so the printing material flows through the distribution controller before entering the molten printing material transport pipe; the distribution controller is used to adjust an inlet size of the molten printing material transport pipe to regulate a flow rate of the printing material;

each of the molten printing material transport pipe has its own distribution controller, allowing for independent control of the flow rate of the printing material in each of the molten printing material transport pipe.

5. The 3D printing-based device of claim 1, wherein after the printing material is extruded from the lining forming mold, the printing material becomes a tubular printing material, and an outer surface of the tubular printing material is in contact with an inner wall of the shield tunnel, and an inner wall of the tubular printing material encircling the 3D printing-based device;

as the 3D printing-based device advances, the tubular printing material first comes into contact with an outer wall of the first lining cooling jacket and then comes into contact with an outer wall of the second lining cooling jacket, while at the same time, cooling water circularly passes through the first lining cooling jacket and the second lining cooling jacket to regulate a temperature of the first lining cooling jacket and the second lining cooling jacket in order to assist in cooling the tubular printing material to the target strength.

6. The 3D printing-based device of claim 5, wherein in an advancing direction of the 3D printing-based device, an outer periphery diameter of the second lining cooling jacket is smaller than an outer periphery diameter of the 3D printing-based device located in front of the second lining cooling jacket, and the outer periphery diameter of the second lining cooling jacket is larger than an outer periphery diameter of the 3D printing-based device located behind the second lining cooling jacket;

a release agent is on the outer wall of the 3D printing-based device located behind the second lining cooling jacket to prevent adhesion between the tubular printing material and the outer wall of the 3D printing-based device.

7. The 3D printing-based device of claim 1, wherein the screw pump motor adjusts the squeezing pressure exerted on the printing material by modulating a rotational torque, ensuring that the molten printing material fills the molten printing material transport pipe and the lining forming mold without any air pocket, thereby guaranteeing that the printing material is continuous and integral when extruded from the upper part of the lining forming mold.

8. A method for using the 3D printing-based device of claim 1, comprising the following steps:

step 1: after the start of a tunnel excavation, as the 3D printing-based device advances in a tunnel, a solid printing material is delivered to the detachable feed bucket via the solid printing material delivery pipe, and the detachable feed bucket is directly connected to an inlet of the single-screw extruder, allowing the solid printing material to flow into the inlet of the single-screw extruder under the influence of gravity;

step 2: while maintaining a transportation of the solid printing material, the solid printing material is conveyed to a front end of the single-screw extruder by continuously rotating a screw of the single-screw extruder, and the front end of the single-screw extruder is distinguished from a back end of the single-screw extruder according to the advancing direction of the 3D printing-based device;

step 3: the solid printing material melts to become the molten printing material under a heating effect of the heating belt when reaching the heating belt; the molten printing material is then distributed to the molten printing material transport pipe through the distribution controller and subsequently enters the lining forming mold;

step 4: after the molten printing material fills the lower part of the lining forming mold, it converges at the long side end and enters the upper part of the lining forming mold, thus forming a full annular surface; the molten printing material becomes the tubular printing material as a complete segment that fits against the inner wall of a tunnel around the 3D printing-based device when moving forward under pressure passing through the first lining cooling jacket and the second lining cooling jacket for cooling.

9. The method of claim 8, wherein an operation of the speed control assembly comprising the following steps:

step 1: set an initial advancing speed V0 of the 3D printing-based device and an initial rotational speed V1 of the screw pump motor at a control center;

step 2: when environmental factors cause an advancing speed of the 3D printing-based device to deviate from the initial advancing speed V0, adjustments are made via the control center to bring the advancing speed of the 3D printing-based device back to the initial advancing speed V0; the environmental factors include encountering one or more of following soil conditions: frozen ground, rock, clay, sand, gravel, poor geological areas, and karst formations;

step 3: when construction difficulty of a current environment is lower than that of an environment at the initial advancing speed V0, increasing the advancing speed of the 3D printing-based device to a speed V2, and V2>V0, and a rotational speed of the screw pump motor is automatically adjusted to a speed V3 by the control system, and V3>V1, which makes a cooling rate of the printing material during solidification match with the speed V2 by accelerating the rotational speed to ensure that the tubular printing material formed at the speed V2 of the 3D printing-based device connects seamlessly with the tubular printing material formed at the initial advancing speed V0 of the 3D printing-based device without any bulging; accelerating the rotational advancing speed increases a rate of material transportation; evaluation indicators of the construction difficulty include one or more of the following factors: the number of types of soil layers in the environment, whether there are buildings around the tunnel, whether the tunnel is within an urban area, and a requirement for noise and environmental pollution at a construction site;

step 4: when the construction difficulty of the current environment is greater than that of the environment at the initial speed V0, reducing the advancing speed of the 3D printing-based device to a speed V4, and V4<V0, and a rotational advancing speed of the screw pump motor is automatically adjusted to V5 by the control system, and V5<V1, which makes a cooling rate of the printing material during solidification match with the speed V4 by reducing the rotational speed to ensure that the tubular printing material formed at the speed V4 of the 3D printing-based device connects seamlessly with the tubular printing material formed at the initial advancing speed V0 of the 3D printing-based device without any bulging; reducing the rotational advancing speed lows down the rate of the material transportation.

10. The method of claim 9, wherein a shield machine advancement control device is set behind the 3D printing-based device which is used to achieve a simultaneous output of the tubular printing material while the 3D printing-based device advances, realizing a continuous printing of a lining structure.

* * * * *